(12) United States Patent
Bopardikar et al.

(10) Patent No.: US 8,281,022 B1
(45) Date of Patent: Oct. 2, 2012

(54) METHOD AND APPARATUS FOR IMPLEMENTING HIGH-PERFORMANCE, SCALEABLE DATA PROCESSING AND STORAGE SYSTEMS

(75) Inventors: Raju C. Bopardikar, Carlisle, MA (US); Jacob Y. Bast, Framingham, MA (US); Gary A. Cardone, Groton, MA (US); David E. Kaufman, Sharon, MA (US); Stuart P. MacEachern, Westboro, MA (US); Bruce D. McLeod, Sudbury, MA (US); James M. Nolan, Jr., Holliston, MA (US); Zdenek Radouch, Newton, MA (US); Jack J. Stiffler, Marion, MA (US); James A. Wentworth, II, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 2017 days.

(21) Appl. No.: 09/608,521

(22) Filed: Jun. 30, 2000

(51) Int. Cl.
*G06F 15/16* (2006.01)
(52) U.S. Cl. .................... 709/229; 709/238; 709/239
(58) Field of Classification Search .............. 711/114, 711/161; 709/214, 215, 226, 225, 238, 239, 709/229; 707/103; 710/8
See application file for complete search history.

(56) References Cited

U.S. PATENT DOCUMENTS

| | | | |
|---|---|---|---|
| 5,355,453 A | 10/1994 | Row et al. | |
| 5,802,366 A | 9/1998 | Row et al. | |
| 5,819,054 A | 10/1998 | Ninomiya et al. | |
| 5,881,284 A | 3/1999 | Kubo | |
| 5,909,686 A * | 6/1999 | Muller et al. | 707/104.1 |
| 5,931,918 A | 8/1999 | Row et al. | |
| 5,963,962 A | 10/1999 | Hitz et al. | |
| 6,012,119 A | 1/2000 | Ninomiya et al. | |
| 6,157,927 A * | 12/2000 | Schaefer et al. | 707/103 R |
| 6,195,703 B1 * | 2/2001 | Blumenau et al. | 709/238 |
| 6,237,063 B1 * | 5/2001 | Bachmat et al. | 711/114 |
| 6,304,942 B1 * | 10/2001 | DeKoning | 711/114 |
| 6,351,775 B1 * | 2/2002 | Yu | 709/238 |
| 6,460,082 B1 * | 10/2002 | Lumelsky et al. | 709/226 |
| 6,665,740 B1 | 12/2003 | Mason et al. | |

FOREIGN PATENT DOCUMENTS

WO WO 00/29954 A1 5/2000

OTHER PUBLICATIONS

Hitachi Ltd, "Fibre Channel Fabric Switch Support", URL:http://www.hitachi.co.jp/Prod/comp/storage/df400/enhans/fc_switch.html, Jan. 7, 2000.

(Continued)

*Primary Examiner* — Adnan Mirza
(74) *Attorney, Agent, or Firm* — Law Offices of Paul E. Kudirka

(57) ABSTRACT

A data system architecture is described that allows multiple processing and storage resources to be connected to multiple clients so as 1) to distribute the clients' workload efficiently across the available resources; and 2) to enable scaleable expansion, both in terms of the number of clients and in the number of resources. The major features of the architecture are separate, modular, client and resource elements that can be added independently, a high-performance cross-bar data switch interconnecting these various elements, separate serial communication paths for controlling the cross-bar switch settings, separate communication paths for passing control information among the various elements and a resource utilization methodology that enables clients to distribute processing or storage tasks across all available resources, thereby eliminating "hot spots" resulting from uneven utilization of those resources.

20 Claims, 12 Drawing Sheets

OTHER PUBLICATIONS

Faessler, Jean-Daniel, "Du Switching Au Routing", URL:http://www.ib-com.ch/pages/archives/00.04/0004commswitching.html, Apr. 13, 2000.

Neema, Farid, "San-The Internconnecting Fabric", URL:http://www.periconcepts.com/WhitePaper/SAN%20Interconnecting%20Fabric.html, May 1999.

* cited by examiner

METHOD AND APPARATUS FOR IMPLEMENTING HIGH-PERFORMANCE, SCALEABLE DATA PROCESSING AND STORAGE SYSTEMS

FIELD OF THE INVENTION

This invention relates to data processing systems and, in particular, to data processing systems involving the transfer, manipulation, storage and retrieval of large amounts of data.

BACKGROUND OF THE INVENTION

In data processing applications involving the transfer, manipulation, storage and retrieval of large amounts of data, the most serious performance limitations include (1) difficulties in moving data between users who need access to the data and resources used to store or process the data and (2) difficulties in efficiently distributing the workload across the available resources. These difficulties are particularly apparent, for example, in disk-based storage systems in which the greatest performance limitation is the amount of time needed to access information stored on the disks. As databases increase in size, requiring more and more disks to store that data, this problem grows correspondingly worse and, as the number of users desiring access to that data increase, the problem is compounded even further. Yet the trends toward both larger databases and an increased user population are overwhelmingly apparent, typified by the rapid expansion of the Internet.

Current techniques used to overcome these difficulties include reducing access time by connecting users to multiple resources over various types of high-speed communication channels (e.g., SCSI buses, fiber channels and Infiniband busses) and using caching techniques in an attempt to reduce the necessity of accessing the resources. For example, in the case of storage systems, large random-access memories are often positioned locally to the users and are used as temporary, or cache, memories that store the most recently accessed data. These cache memories can be used to eliminate the need to access the storage resource itself when the cached data is subsequently requested and they thereby reduce the communication congestion.

Various distribution algorithms are also used to allocate tasks among those resources in attempts to overcome the workload distribution problem. In all cases, however, data is statically assigned to specific subsets of the available resources. Thus, when a resource subset temporarily becomes overloaded by multiple clients simultaneously attempting to access a relatively small portion of the entire system, performance is substantially reduced. Moreover, as the number of clients and the workload increases, the performance rapidly degrades even further since such systems have limited scalability.

SUMMARY OF THE INVENTION

In accordance with one illustrative embodiment of the invention, users are connected to access interfaces. In turn, the access interfaces are connected to a pool of resources by a switch fabric. The access interfaces communicate with each client with the client protocol and then interfaces with the resources in the resource pool to select the subset of the resource pool to use for any given transaction and distribute the workload. The access interfaces make it appear to each client that the entire set of resources is available to it without requiring the client to be aware that that the pool consists of multiple resources.

In accordance with one embodiment, a disk-based storage system is implemented by client interfaces referred to as host modules and processing and storage resources referred to as metadata and disk interface modules, respectively.

The invention eliminates the prior art problems by enabling both client interfaces and processing and storage resources to be added independently as needed, by providing much more versatile communication paths between clients and resources and by allowing the workload to be allocated dynamically, with data constantly being directed to those resources that are currently least active.

BRIEF DESCRIPTION OF THE DRAWINGS

The above and further advantages of the invention may be better understood by referring to the following description in conjunction with the accompanying drawings in which.

DETAILED DESCRIPTION

Figure 1:
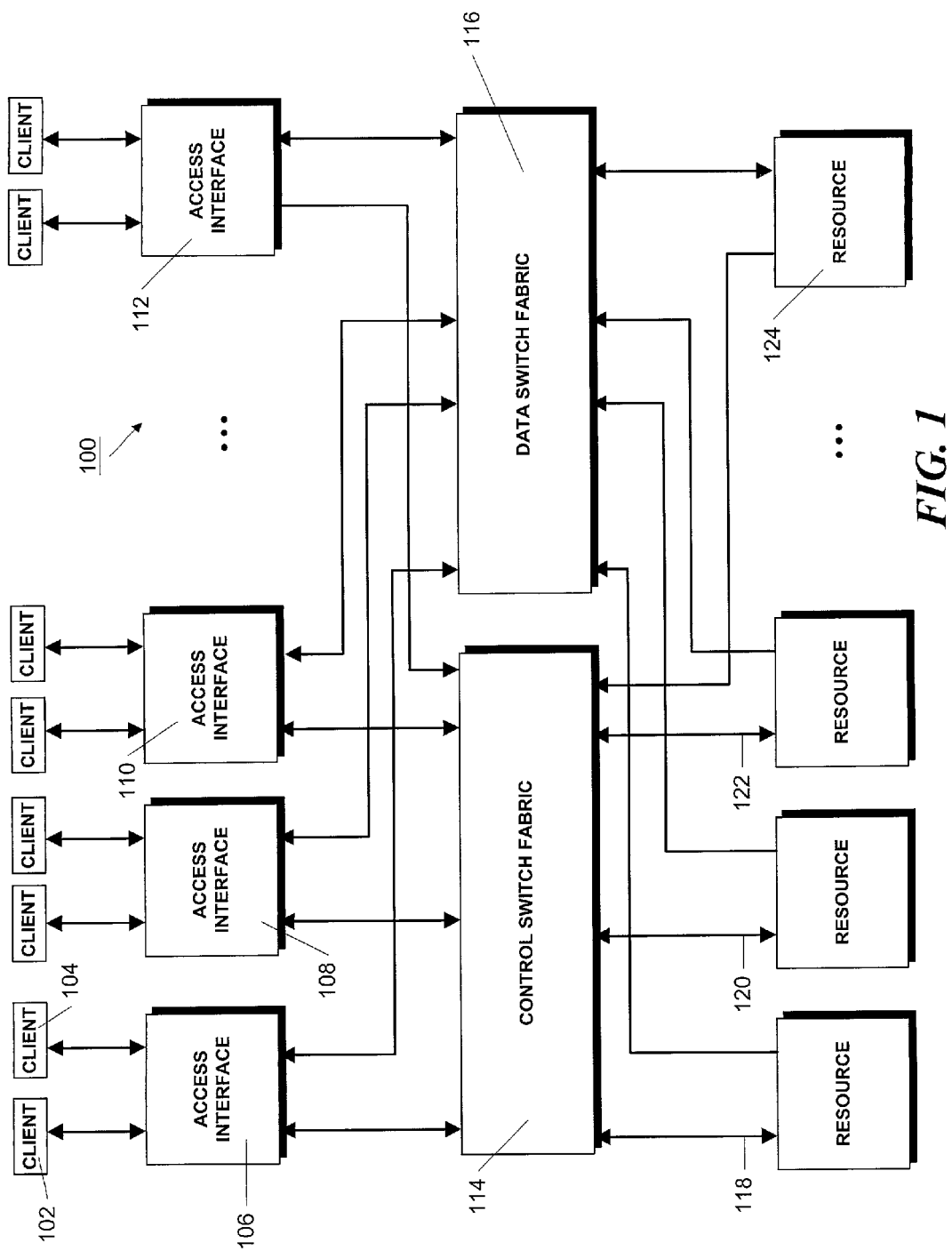
FIG. 1 is a block schematic diagram of a resource access system constructed in accordance with the principles of the present invention.

A block schematic diagram of a resource access system 100 in accordance with an embodiment of the invention is shown in FIG. 1. The system consists of three components. Access interfaces 106-112 provide clients, such as client 102 and 104, with access to the system 100 and provide other access-related resources. A pool of resources 118-124 may comprise, for example, data processing or storage devices. A switch fabric 114 and 116 interconnects the access interfaces 106-112 and the resources 118-124. Since the requirements for communicating control information differ significantly from those for data communication, the switch fabric consists of a control switch fabric 114 and a data switch fabric 116 in order to provide different paths and protocols for control and data. For example, control transfer protocols generally divide the control information into relatively small packets that are transferred using packet-switching technology. In contrast, data transfer protocols generally consist of larger packets conveyed over a circuit-switched fabric. The separation of the switch fabric into two sections 114 and 116 allows each type of communication path to be optimized for its specific function and enables service requests to be transferred to a resource, via the control switch fabric 114 without interfering with the data transferring capacity of the data switch fabric 116.

In accordance with the principles of the invention, the access interfaces 106-112 operate to virtualize the pool of resources 118-124, thereby making it appear to each client, such as clients 102 and 104, that the entire set of resources 118-124 is available to it without requiring the client to be aware of the fact that that the pool is in fact partitioned into multiple resources 118-124.

This virtualization is accomplished by enabling the access interfaces 106-112 to serve as communication protocol terminators and giving them the ability to select the subset of the resource pool 118-124 to use for any given transaction. An access interface, such as interface 106, is thus able to communicate with a client, such as client 102, using the client's protocol for messages. The interface 106 parses a message received from the client into a portion representing data and a portion consisting of commands or requests for service. The interface 106 then interprets those requests and distributes the workload and the associated data across the pool of resources 118-124.

The distribution of the workload may entail accessing a number of resources by the access interface and brings with it several major advantages. For example, it allows the workload to be distributed across the available resources, preventing the "hotspots" typically encountered when multiple clients independently attempt to access multiple resources. Since clients generally do not have knowledge about other clients' activities, it is very difficult, if not impossible, for the clients themselves to achieve any such level of load balancing on their own. In addition, it enables resources to be added non-disruptively to the resource pool. Clients need not be aware that additional resources have been made available since the access interfaces themselves are responsible for allocating resources to requests for service. This, in turn, allows the system capacity to be scaled to meet demand as that demand increases over time. Similarly, the ability of the access interfaces to distribute workloads allows the external connectivity to be increased to accommodate additional clients, again without disrupting on-going activities with existing clients.

The inventive system can be used to construct resource allocation systems for any type of resources. The remainder of this disclosure describes an embodiment which implements a disk-based storage system, but this embodiment should not be considered as limiting. In this embodiment, the access interfaces 106-112 are referred to as "host interface modules" and the resources are disk storage devices. The disk storage devices are connected to the switch fabric by "disk interface modules" and separate processing modules called "metadata" modules are also provided.

Figure 2:
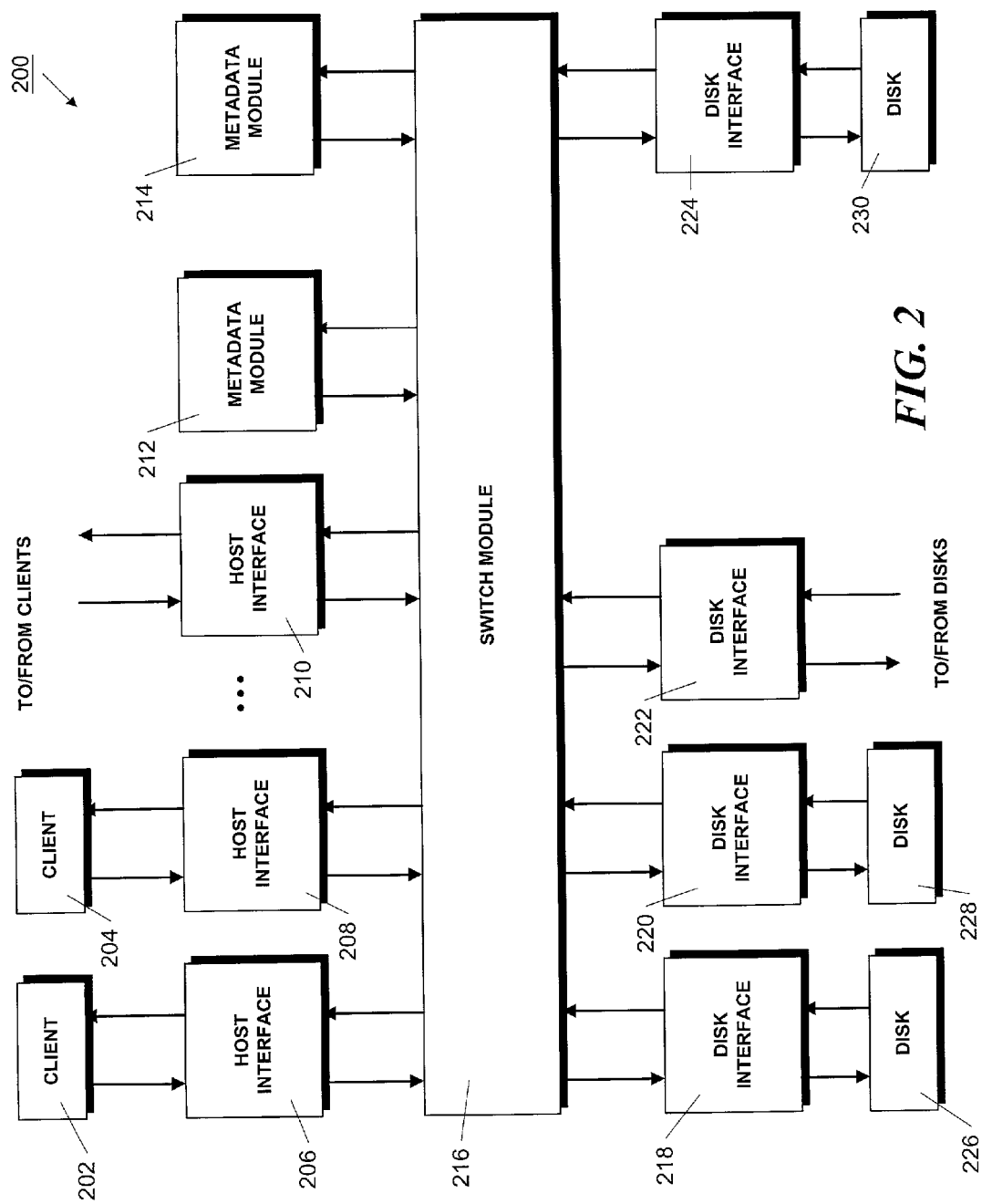
FIG. 2 is a block schematic diagram of an illustrative storage system embodiment implemented with the architecture of FIG. 1.

The storage system embodiment is shown in FIG. 2. The storage system 200 consists of a set of access modules 206-210 called host interface modules, and two types of resource modules: disk interface modules 218-222 and metadata modules 212-214. The host interface modules 206-210 provide one or more clients, of which clients 202 and 204 are shown, access to the system 200 and communicate with each client 202, 204 using the client's message passing protocol. The host interface modules 206-210 parse requests from the clients 202, 204 for disk and file system accesses and distribute the storage load across the entire set of disks connected to the system 200, of which disks 226-230 are shown. The host interface modules are responsible for the logical allocation of the storage resources.

The disk interface modules 218-222 each support up to 450 disks and are responsible for the physical allocation of their disk resources. The disk interface modules provide data buffering, parity generation and checking and respond to requests from the host interface modules for access to their associated disks.

The metadata modules 212-214 provide a processing resource that maintains the structure and consistency of file systems used in the system. They are used when the storage system serves as a standalone file system, for example, in a networked environment, and hence assumes the responsibility for maintaining the file systems. The data used to describe the objects in the file system, their logical locations, relationships, properties and structures, is called "metadata." In applications in which the storage system is directly attached to a host that implements this function itself, metadata modules are not needed and are accordingly not included in configurations intended for such applications. Since these applications and other storage system applications (e.g., HTTP server, web cache protocol server, and FTP server applications) require a subset of the functionality needed for standalone file systems, the illustrated embodiment is configured as a standalone file system, but the invention is equally effective in direct-attach applications. The following description applies equally to systems configured for direct attachment.

The switch module 216 provides the command and data paths used to interconnect the other three module types and contains both the control and data switches. In this embodiment of the invention, module 216 is capable of passing a block of data, for example, two kilobytes, between arbitrary pairs of modules at approximate fixed time increments, for example, approximately every four microseconds. Each host interface, disk interface and metadata module operates in full duplex mode, thereby enabling it to transmit and receive simultaneously at the aforementioned rate thereby supporting a system-level data bandwidth of up to N gigabytes/second, with N the total number of host interface, disk interface and metadata modules in the system.

The previously listed advantages of this architecture take the following more concrete forms when applied to the storage system. First, host interface modules are allowed to send incoming data to any available disk interface module for storage regardless of where that data might have been previously stored. This ability, in turn, distributes read accesses across the full complement of disks avoiding the inevitable hotspots encountered in conventional storage systems in which disks are partitioned into physical volumes and data must be directed to a specified volume.

Second, additional metadata modules, disk interface modules and physical disks can be added at any time. Clients need not be aware that additional resources have been made available since knowledge of where data is physically stored is not visible to them. This allows the logical space allocated to clients to far exceed the physical space that is currently available. Physical disk space does not need to be added until clients begin to use up a significant portion of the available physical space, which is typically much less than the allocated logical space.

Third, additional host interface modules can be added at any time to increase the connectivity available to the current clients or to add new clients. Since all host interface modules have equal access to all resources, traditional data segmentation and replication is not needed to provide access to an expanded set of clients. For the same reason, clients can transfer data to multiple disks in a single transfer; clients are, in fact, unconcerned about where that data is physically stored.

Figure 3:
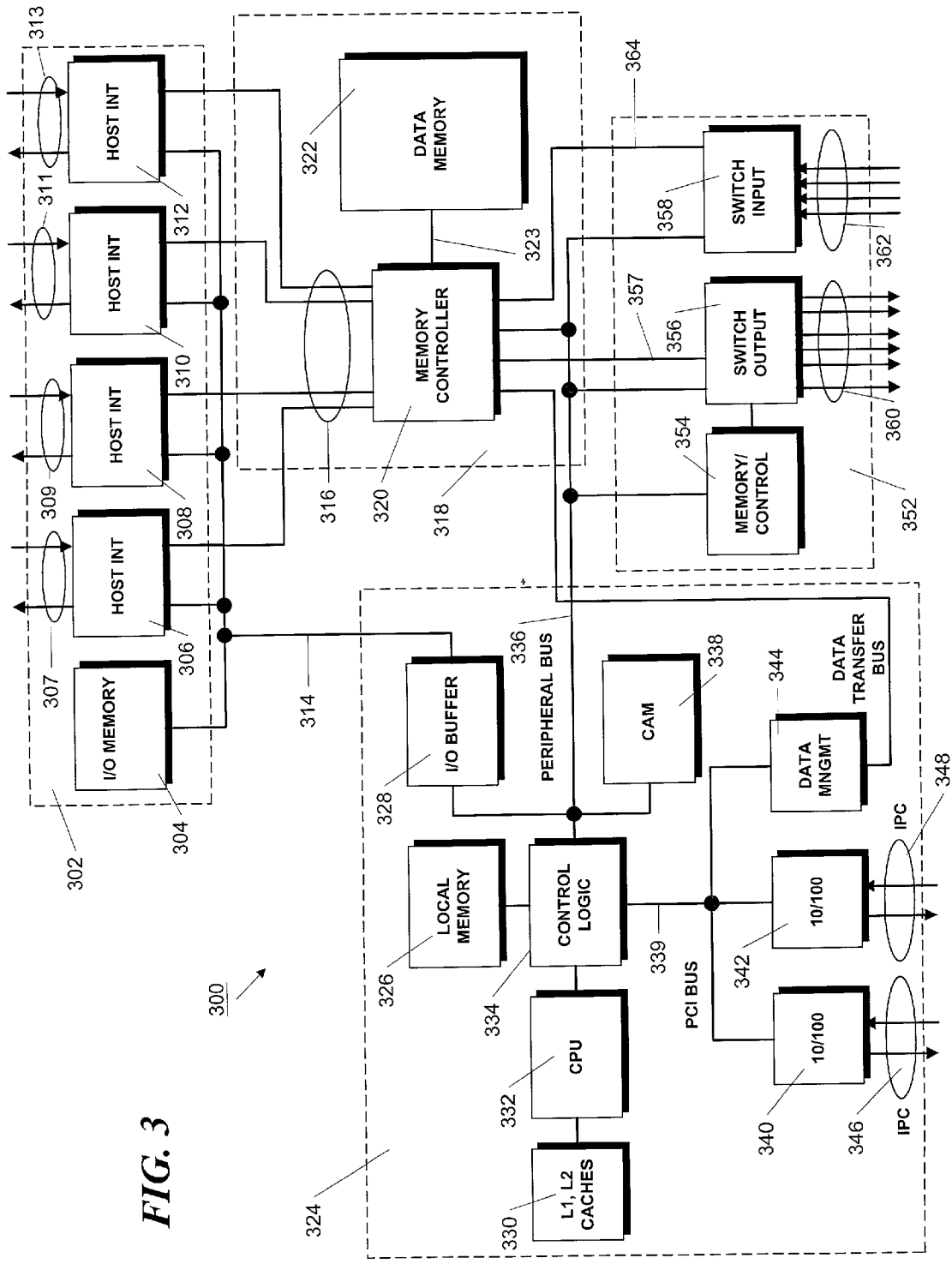
FIG. 3 is a detailed block schematic diagram of a host interface module.

A more detailed diagram of a host interface module is shown in FIG. 3. Each host interface module 300 is composed of four major components: a central processing unit (CPU) complex 324, a data complex 318, an input/output (I/O) complex 302 for communicating with the host and a switch interface 352. The CPU complex 324, in turn, consists of a microprocessor CPU 332 with its associated level-one (internal) and level-two (external) caches 330, memory and I/O bus control logic 334, local random-access memory (RAM) 326, content-addressable memory (CAM) 338. A peripheral bus 336 provides access to the CAM 338, the data complex 318, the switch interface 352, and, through an I/O buffer 328, to the I/O complex 302. A PCI bus 339 provides access over the data transfer bus 350 to the data complex 318 and to two full-duplex channel adapters 340, 342 which connect to two full-duplex 10/100 megabit Ethernet channels called the Interprocessor Communication channels (IPCs) 346, 348 used to communicate with other modules in the system.

The data complex 318 comprises a large (typically two-gigabyte), parity-protected data memory 322 supported with a memory controller 320 that generates the control signals needed to access the memory 322 over a 128-bit data bus 323 and interface logic and buffers providing links to the I/O complex 302, the switch interface 352 and, over the data transfer bus 350, to the CPU complex 324. The memory controller 320 responds to read requests from the other sections of the host interface module and forwards the requested information to them. Similarly, it accepts write requests from them and stores the associated data in the specified locations in memory 322.

The I/O complex 302 is used to communicate with the clients via ports 307-313. There are two versions of the I/O complex 302, one version supports four one-gigabit, full-duplex Ethernet ports and the second version supports four one-gigabit, full duplex Fibre Channel ports. The second of these versions is typically used for systems directly attached to hosts; the first version is used for network-attached storage systems and is a preferred embodiment. Multiple protocols, including SCSI, TCP/IP, UDP/IP, Fibre Channel, FTP, HTTP, bootp, etc., are supported for communicating over these ports between clients and the host interface modules. These protocols are interpreted at the host interfaces 306-312. Commands (e.g., read or write a file, lookup a file or directory, etc.) are buffered in the local I/O memory 304 for access by the CPU software via bus 314. Data received from the clients, via ports 307-313, is sent to the data memory 322 where it is buffered pending further action. Similarly, data passed from the storage system 300 to clients is buffered in the data memory 322 while the I/O complex 302 generates the appropriate protocol signals needed to transfer that data to the client that requested it.

The switch interface 352 contains a buffer memory 354 and associated logic to accept, upon command from the CPU software over the peripheral bus 336, commands to transfer data, via bus 357, from the data complex 318 to external modules. It buffers those commands and submits requests to the switch (216, FIG. 2) for access to the destinations specified in those commands. When a request is granted, the switch output logic 356 commands the memory controller 322 to read the specified locations in memory 322 and transfer the data to it to be forwarded to the intended destination. Similarly, the switch input logic 358 accepts data from the switch at the full switch bandwidth and forwards it, along with the accompanying address, to the data complex 318 via bus 364. Data is transferred from the output logic 356 to the switch and from the switch to the input logic 358 using, in each case, four serial, one-gigabit/second connections 360, 362 giving the host interface module the ability to transmit, and simultaneously to accept, data at a rate of 500 megabytes/second. Similarly, the request and grant paths to the switch are also both implemented with serial one-gigabit/second links.

When a request is received from a client over one of the Ethernet or Fibre Channels 307-313, the I/O complex 302 generates the appropriate communication protocol responses and parses the received packet of information, directing the request to buffer 304 to await processing by the CPU software and any associated data to buffer 304 for subsequent transfer to the data memory 322. The processing steps taken by the software running on the host interface module CPU 332 are illustrated in the flowchart shown in FIGS. 4A-4C.

Figure 4A:
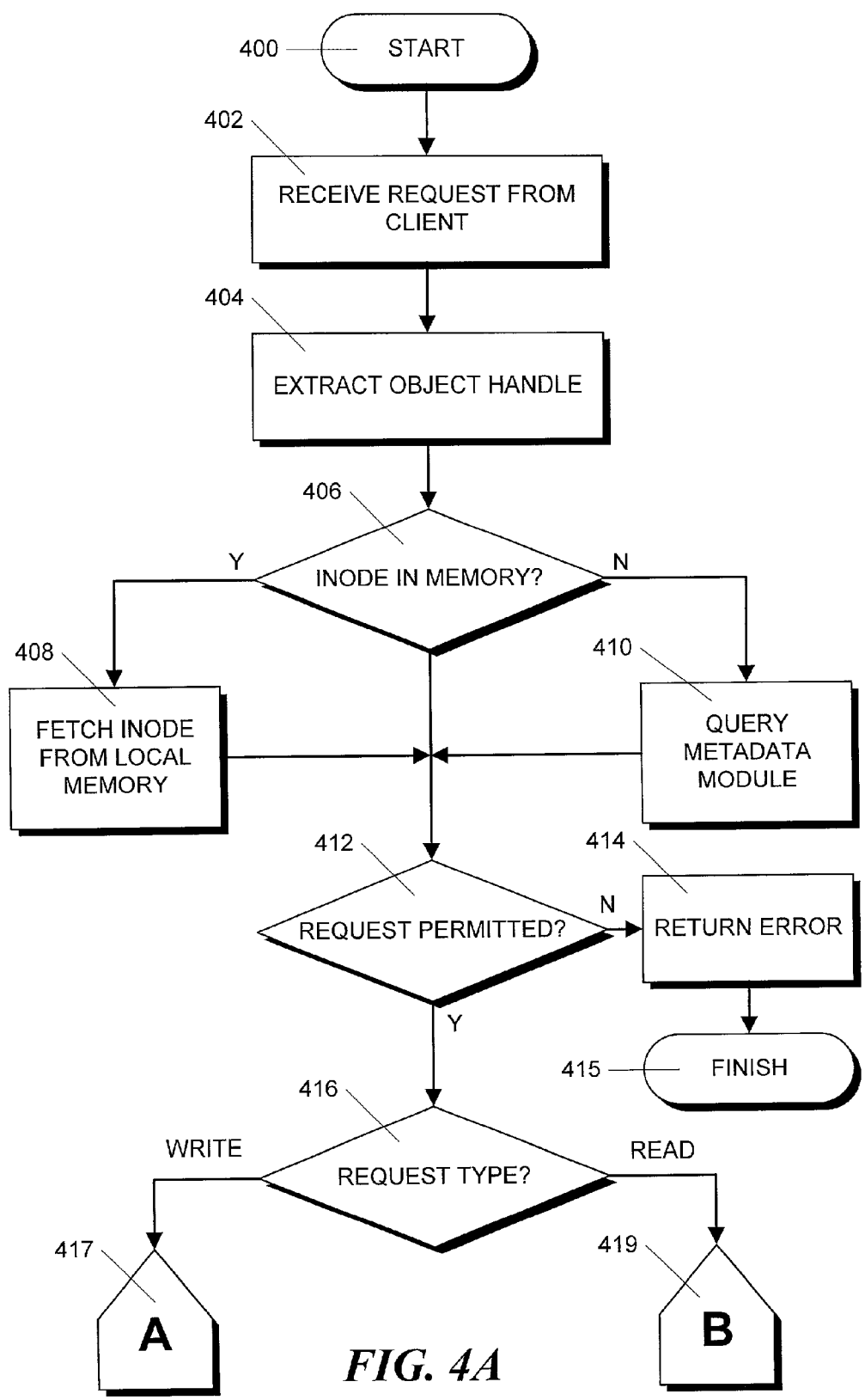
FIGS. 4A-4C, when placed together, form a flowchart illustrating the steps in a process carried out by the host interface module in response to a request from a client.

In FIG. 4A, the process starts in step 400 and proceeds to step 402, where the host interface receives a request from the client. The request always contains a file or directory "handle" that has been assigned by internal file system processing to each data object. This file system processing is typically done in the metadata module. The handle identifies that object and is sent to the client to be used when the client is making future references to the object. Associated with each such handle is an "inode" which is a conventional data structure that contains the object "attributes" (i.e., the object size and type, an identification of the users entitled to access it, the time of its most recent modification, etc.) of the file or directory. Each inode also contains either a conventional map, called the "fmap", or a handle, called the "fmap handle", that can be used to locate the fmap. The fmap identifies the physical locations, called the global physical disk addresses (GPDAs), of the component parts of the object indexed by their offsets from the starting address of that object. In step 404, upon reading the request from the request buffer 304, the CPU software extracts the object handle from the request.

Next, in step 406, the CPU software queries the local CAM memory 338, using the extracted object handle as a key, to determine if the desired inode information is already stored in host interface local memory 326. If the inode information is present in the memory 326, the CAM memory access results in a "hit" and the CAM memory 338 returns the address in local memory 326 where the inode information can be found. In step 408, this address is then used to fetch the inode information from the local memory 326.

If the inode information is not present in the local memory as indicated by a CAM memory "miss", then, in step 410, the software uses the IPC links 346 and 348 to contact the appropriate metadata module (which is identified by the object handle) for the needed information which is returned to it also over the IPC links. Once the software has located the inode (or a critical subset of the contents of the inode), it verifies that requested action is permitted (step 412). If the action is not permitted, an error is returned in step 414 and the process ends in step 415.

Alternatively, if the requested action is permitted, then, in step 416, the CPU software determines which response is required. If stored data is to be read, the process proceeds, via off-page connectors 419 and 421 to step 418 shown in FIG. 4C where the CPU software determines whether the fmap or the fmap handle required to honor that request is in the inode. If the fmap itself is too large to be contained in the inode, the process proceeds to step 420 where the software again consults its CAM 338, this time using the fmap handle as the key, to determine if the fmap pointed to by that handle is stored locally. If it is not, the process proceeds to step 422, where the software extracts the GPDA for the fmap from the fmap handle and sends a request for the fmap, or for the next level of fmap pointers, over the IPC links 346, 348 to the disk interface module identified by the GPDA, which returns the fmap, or the page containing the next level of fmap pointers, through the switch module and switch interface 352 to the host interface module data memory 322. The software can then access this information over the data transfer bus 350. In step 424, the software checks the information in the local data memory 322 to determine whether it has obtained the fmap. If not the process returns to step 420 and continues this process until it finds the fmap and the GPDA of the data itself, during each iteration of the process checking its CAM 338 at step 422 to determine if the desired information is cached in the data memory 322.

When the software locates the GPDA of the desired data either through the process set forth in steps 420-424 or if it was determined that the fmap was in the inode in step 418, in step 426, the software again checks the CAM 338 to determine if the data resides in the host interface data memory 322. If the data is not in the data memory 322, in step 428, the software sends a read request for the data to the disk interface module to retrieve that data identified by the GPDA. Once the data is in the host interface data memory 322, in step 430 the software sends a response over the peripheral bus 336 via the I/O buffer 328 to the I/O complex 302 indicating the location in the data memory 322 where the desired information resides, thereby enabling the I/O complex 302 to complete the transaction by returning the requested information to the client. The least-recently-used (LRU) replacement algorithm is used to manage the local memory 322 and data memory caches. The process then ends in step 432.

Figure 4B:
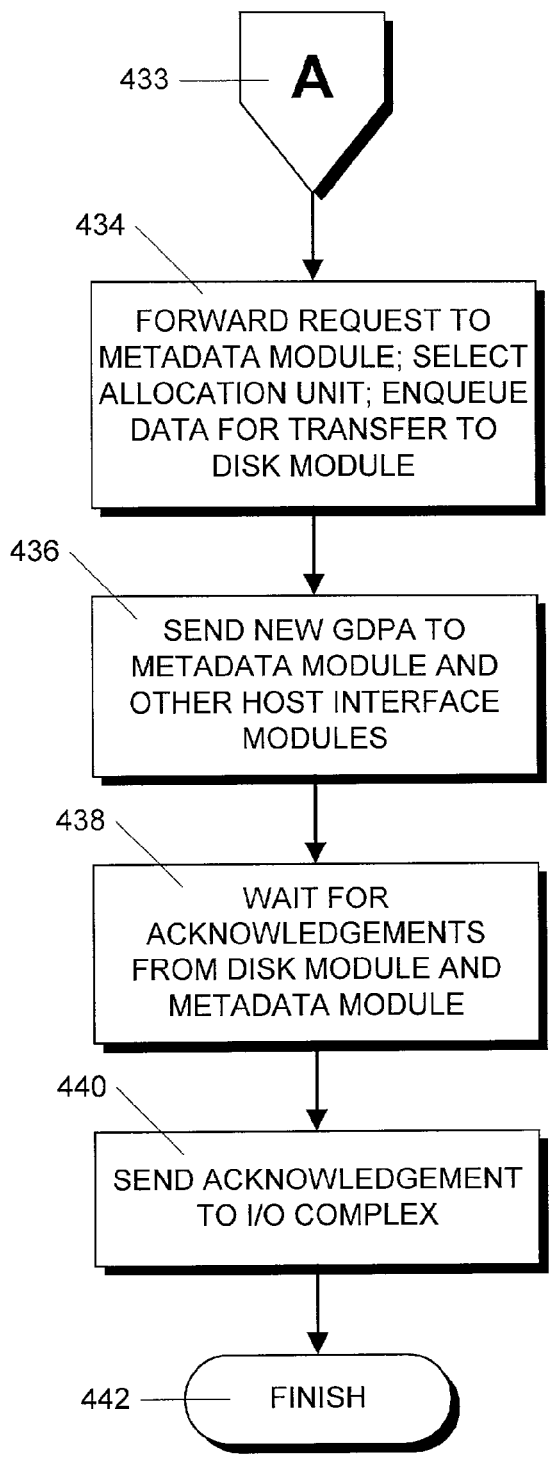
Figure 4C:
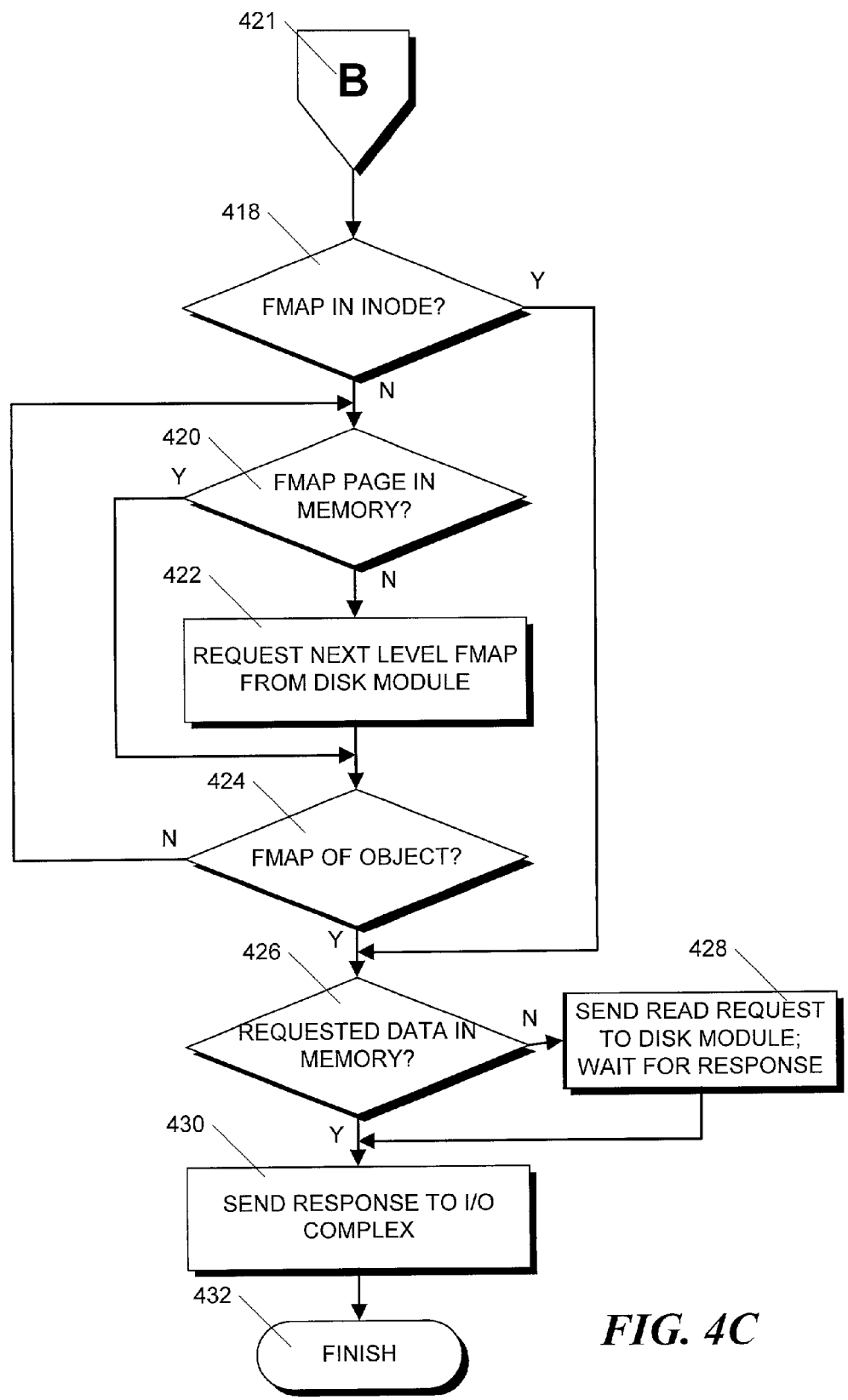

If in step 416, a write operation is requested, the process proceeds, via off-page connectors 417 and 433, to steps 434-440 in FIG. 4B. Prior to any writes to disk, the disk interface module preallocates or assigns "allocation units" (AUs) of physical disk space to each host interface module. Each allocation unit consists of a 512-kilobyte segment spread evenly across a plurality of (for example, four) disks. The disk interface module sends to each host interface module over an IPC channel 346, 348, the logical addresses of the allocation units that have been set aside for it. The host interface module then uses these logical addresses to specify the location of an object. Accordingly, the GPDA assigned by a host interface module to identify the location of a particular object specifies the "system parity group number" (SPGN), "zone" and offset within the zone where that object can be found. During initialization, the system determines the storage topology and defines a mapping associating SPGNs and specific disk interface modules. This level of mapping provides additional virtualization of the storage space, enabling greater flexibility and independence from the specific characteristics of the physical disks. The zone defines a particular region within a given SPGN. The disk module reserves certain zones for data represented by that allocation unit. The disk interface module also reserves certain zones for data that is known to be frequently accessed, for example, metadata. It then allocates these zones near the center of the disk and begins allocating the rest of the space on the disk from the center outward towards the edges of the disk. Consequently, most of the disk activity is concentrated near the center, resulting in less head movement and faster disk access.

If, in step 416, it is determined that the host interface module received a write request from the client, the process proceeds, via off-page connectors 417 and 433, to step 434 where the host interface module forwards the request to the metadata module or other file system. In parallel, the software assigns the associated data, which is buffered by the I/O complex 302, to the appropriate preallocated allocation unit in the data memory 322 and sends a request to the switch through the switch interface 352 to enqueue the data for transmission, in, typically, two-kilobyte packets, to the corresponding disk interface module.

Next, in step 436, the software then sends the GPDA(s) of the new location for that data over an IPC channel 346, 348 to the appropriate metadata module and broadcasts that same information over IPC channels 346, 348 to all other host interface modules in the system so that they can update their copies of the fmap in question. Alternatively, the software can broadcast invalidate messages to the other host interface modules causing them to invalidate, rather than update, the associated fmap. Then in step 438, the host interface module waits for acknowledgements from the disk interface module and metadata module. Acknowledgements are sent to the host interface module over the IPC channels 346, 348 from the disk interface module when the data has been received and from the metadata module when it has updated its copy of the fmap. When both acknowledgements have been received, in step 440, the CPU software signals the I/O interface 302 to send an acknowledgement to the client indicating that the data has been accepted and is secure. By "secure" it is meant that the data has been stored in two independent modules (the host interface module and a disk interface module) and the associated metadata updates either have also been stored in two modules (the host interface module and a metadata module) or a log of those updates has been stored on a second module. The process then ends in step 442

The preallocation of allocation units has several significant advantages over the current state of the art in disk storage. In particular, the host interface module is able to respond to write requests without having to wait for disk space to be allocated for it, allowing it to implement the request immediately and to acknowledge the write much more rapidly. In effect, the preallocation gives the host interface module direct memory access to the disk. This ability to respond quickly is also enhanced by the fact that the data write does not need to wait for the metadata update to be completed.

As discussed below each disk interface module also maintains cached copies of allocation units. When a cached copy of an allocation unit in a disk interface module has been filled and written to disk, the disk interface module releases the cached copy, preallocating a new allocation unit, both on disk and in its cache, and sending the host interface module a message to that effect over the IPC 346, 348. The disk interface module can then reuse the cache memory locations previously occupied by the released allocation unit. At any given time, each host interface module has several allocation units preallocated for it by each disk interface module. Host interface modules select which allocation unit to use for a given write based solely on the recent activity of the associated disk interface module. This enables the workload to be distributed evenly across all disks, providing the system with the full disk bandwidth and avoiding the serious performance limitations that are frequently encountered in standard storage systems when multiple hosts attempt to access the same disk at the same time.

In accordance with one aspect of the invention, the data assigned to a given allocation unit may come from multiple hosts and multiple files or even file systems. The only relationship among the various data items comprising an allocation unit is temporal; they all happened to be written in the same time interval. In many cases, this can offer a significant performance advantage since files, or portions of files, that are accessed in close time proximity tend to be re-accessed also in close time proximity. Thus, when one such file is accessed, the others will tend to be fetched from disk at the same time obviating the need for subsequent disk accesses. On the other hand, this same process obviously gives rise to potential fragmentation, with the data associated with a given file ending up stored in multiple locations on multiple disks. Procedures to mitigate the possible deleterious effect of fragmentation when those files are read are discussed below. This technique for allowing data to be stored anywhere, without regard to its content or to the location of its prior incarnation, allows for superior, scalable performance.

As in any storage system, it is necessary to identify disk sectors that contain data that is no longer of interest, either because the file in question has been deleted or because it has been written to another location. This is accomplished in the current invention by maintaining a reference count for each page stored on disk. When a page is written to a new location, new fmap entries must be created to point to the data as described in the preceding paragraphs. Until the pages containing the old fmap entries have been deleted, other pages pointed to by other entries on those same pages will now have an additional entry pointing to them. Accordingly, their reference counts must be incremented. When an fmap page is no longer needed (i.e., when no higher-level fmap points to it) it can be deleted and the reference counts of the pages pointed to by entries in the deleted fmap page must be decremented. Any page having a reference count of zero then becomes a "free" page and the corresponding disk locations can be reused.

This procedure allows volumes to be copied virtually instantaneously. Volume copies are commonly used to capture the state of a file system at a given instant. To effect a volume copy, it is only necessary to define a new volume with pointers to the fmaps of the files that are being copied. When a page in a copied file is to be modified, the new fmap entries point to the new location while the old fmap entries point to the original, static, version of the file. As a result, unmodified pages are now pointed to by more than one fmap entry and their reference counts are incremented accordingly to prevent their being deleted as long as any copy of the volume is still of interest.

Figure 5:
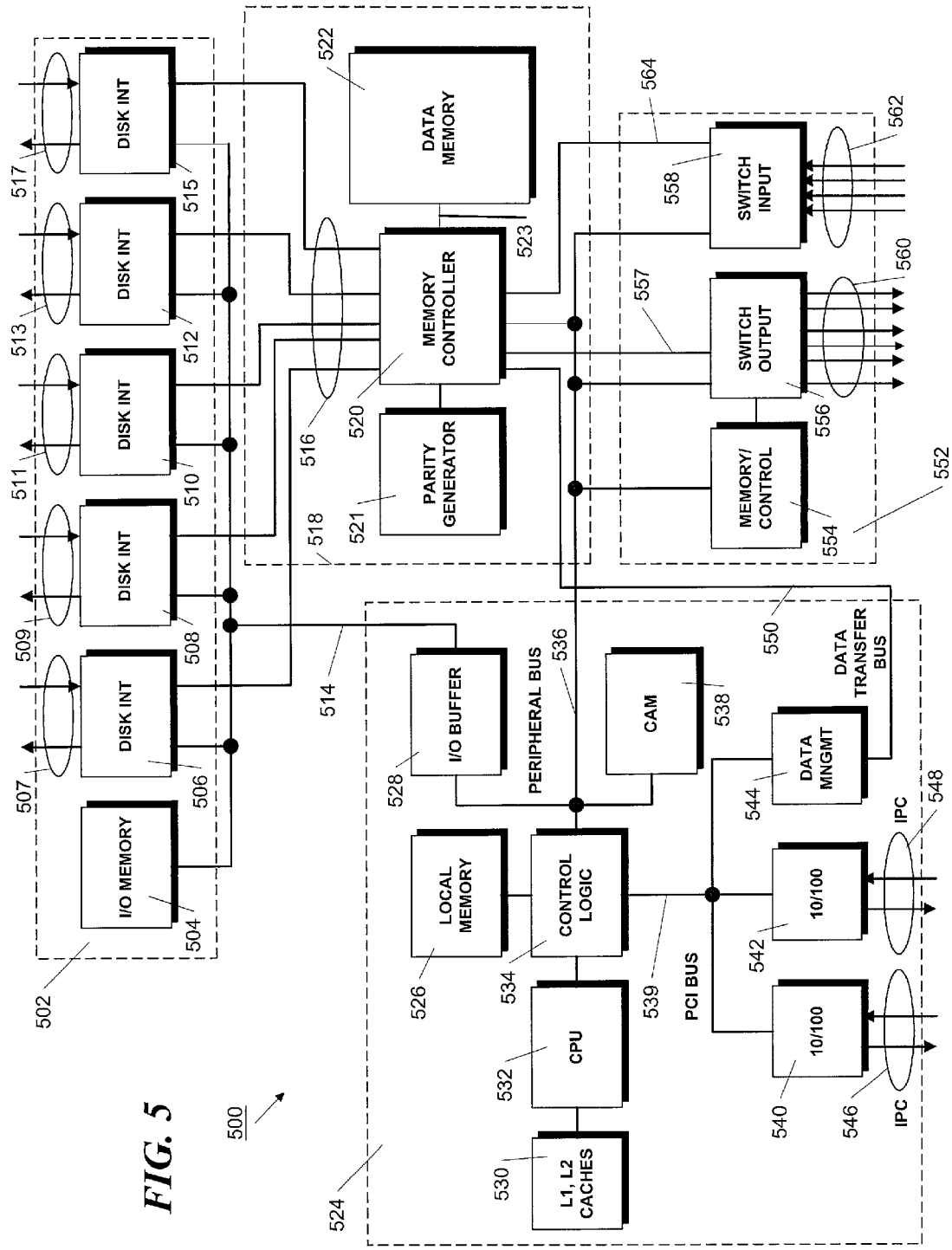
FIG. 5 is a detailed block diagram of a disk interface module.

FIG. 5 illustrates in more detail the construction of a disk interface module 500. All disk interface modules contain the same construction and are interchangeable. The construction of each disk interface module is similar to the construction of a host interface module shown in FIG. 3 and similar parts have been given corresponding numeral designations. These parts operate in a fashion identical with their corresponding counterparts in FIG. 3. For example, data memory 322 corresponds to data memory 522. The major differences between the two modules lie in the I/O complex 502 and in the data complex 518. The I/O complex 302 in each host interface module is replaced in each disk interface module with a complex 502 consisting of five one-gigabit, full-duplex Fibre Channel interfaces (504-515), each containing the logic needed to send data to and to retrieve data from disk drives from various manufactures over five Fibre channels 507-517. These Fibre Channel interfaces 504-515 are used to communicate with sets of five disks, each channel supporting up to 90 disks, enabling each disk interface module 500 to control up to 450 disks. Parity information is stored along with the data, so twenty percent of the disk space is used for that purpose. However, each disk interface module can still manage nearly 33 terabytes of data using 73-gigabyte disks.

All disks connected to a disk interface module are dual-ported with the second port connected to a second disk interface module. In normal operation, half the disks connected to any given disk interface module are controlled solely by it. The disk interface module assumes control over the remaining disks only in case of a fault in the other disk interface module that has access to the disks. This prevents the loss of any data due to the failure of a single disk interface module.

The data complex 518 in each disk interface module is identical to the data complex 318 in a host interface module 300 except for the addition of a special hardware unit 521 that is dedicated to calculating the parity needed for protection of the integrity of data stored on disk. During a disk write operation, the memory controller 520 successively transfers each of a set of four blocks of data that is to be written to disk to the parity generator 521 which generates the exclusive-or of each bit in the first of these blocks with the corresponding bit in the second block, the exclusive-or of these bits with the corresponding bits in the third block and the exclusive-or of these bits with their counterparts in the fourth block. This resulting exclusive-or block is then stored in memory 522 to be transferred, along with the data, to the five disks over five independent channels 507-515. The size of the blocks is referred to as the "stripe factor" and can be set according to the application. The specific disk used to store the parity block is a function of the allocation unit being stored. This allows the parity blocks to be spread evenly across the five disk channels 507-515.

Figure 6:
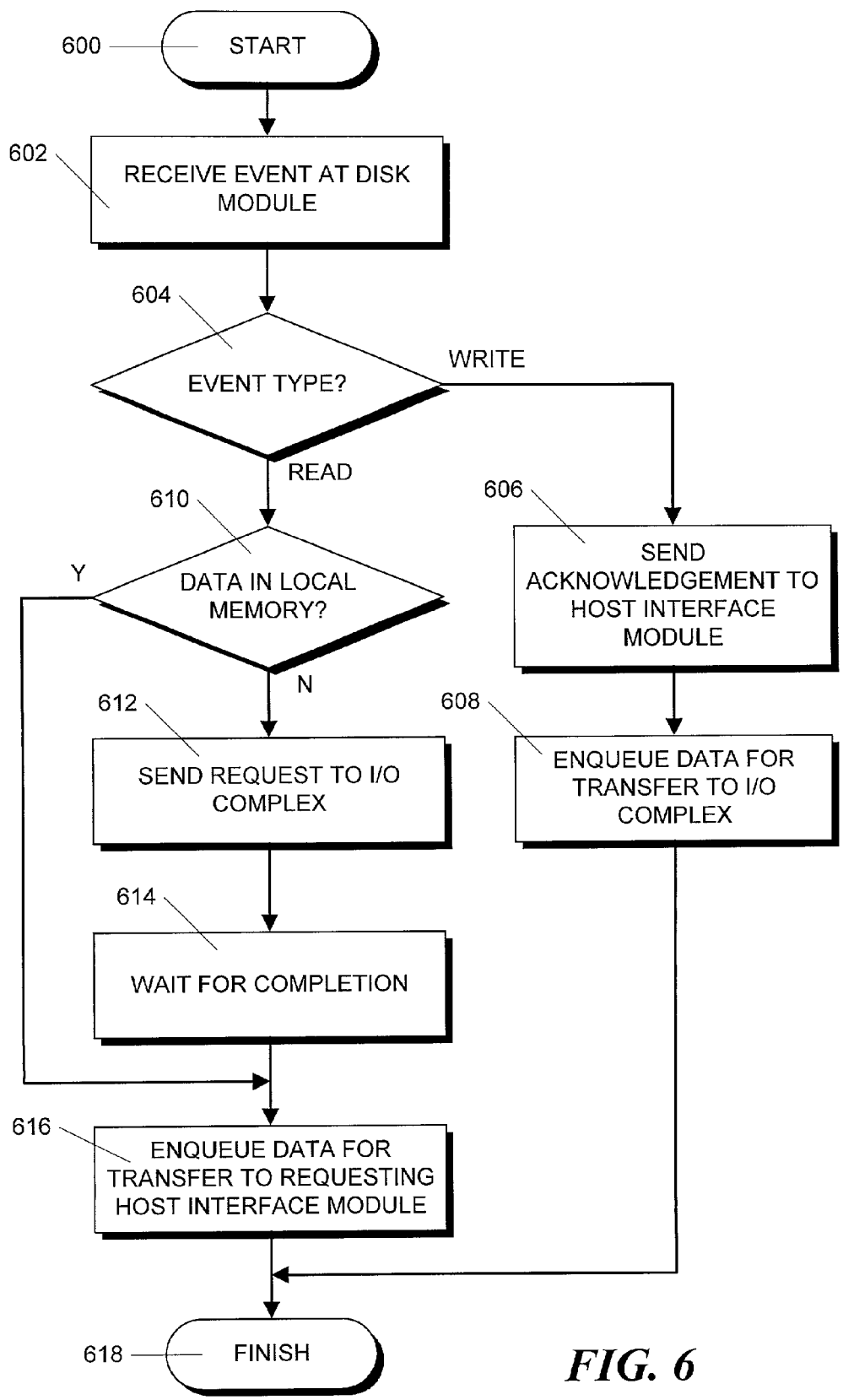
FIG. 6 is a flowchart illustrating the processing steps performed by software running in the disk interface module.

The steps taken by the disk interface module CPU 532 in response to read and write requests are illustrated in the flowchart in FIG. 6. The process begins in step 600 and proceeds to step 602 in which a new event is received by the disk interface module. On detecting that a new event has occurred, i.e., that either data has been received over the switch or a request has been received over the IPC, the CPU software in the target disk interface module determines the appropriate action in step 604. If the event is a read request, the process proceeds to step 610 in which the CPU software checks the disk interface module CAM 538, using the GPDA provided in the request as a key, to determine if the desired object is cached in its local data memory 522. If the data is cached, the process proceeds to step 616, described below.

Alternatively, if in step 610, it is determined that the data is not cached, the process proceeds to step 612 in which software sends a request to the I/O complex 502 directing that the requested data be read, along with, typically, several adjacent disk sectors in anticipation of subsequent reads, and stored in an assigned location in the data memory 522. The number of additional pages to be read is specified in the read request generated in the requesting host interface module, this number is determined from an examination of the type of file being read and other information gleaned by the host interface module from the attributes associated with the file. The additional pages are cached in case they are subsequently needed and overwritten if they are not.

The CPU software then polls the I/O complex 502 to determine when the read is complete as illustrated in step 614. When the data is located in the data memory 522, either through a cache hit or by being transferred in from disk, in step 616, the software sends a message to the switch interface 552 thereby enqueuing the data for transmission to the requesting host interface module. While any data item cached in the disk interface module data memory 522 as the result of a write must also be cached in some host interface module data memory, the data item is not necessarily cached in the memory of the host interface module making the read request. Similarly, data may be cached in a disk interface module due to a prior read from some host interface module other than the one making the current request.

If, in step 604, it is determined that a write request has been received, the process proceeds to step 606. Allocation units that have been preallocated to host interface modules are represented by reserved cache locations in the disk interface module local memory 522 and by "free space" on disk, that is, by sectors that no longer store any data of interest. When the switch interface 552 receives write data from a host interface module, it stores the data directly in the preassigned allocation unit space in its data memory 522 and enqueues a message for the CPU software that the data has been received. Upon receiving the message, the software sends an acknowledgement over the IPC links 546, 548 to the appropriate host interface module as shown in step 606 and enqueues the data for transfer to disk storage, via the I/O complex 502, as shown in step 608. The process then terminates in step 618.

When disk bandwidth is available, or when space is needed to accommodate new data, the CPU software instructs the I/O complex 502 to transfer to disk storage the contents of one allocation unit cached in the data memory 522. If possible, the CPU software selects an allocation unit that is already full to store to disk and, of full allocation units, it selects an allocation unit that is "relatively inactive." One typical method for performing this selection is to select the allocation unit that has been least recently accessed (according to one of several well-known least-recently-used algorithms) but other criteria could also be used. For example, one of the pre-allocated 2% allocation units may be selected at random. Alternatively, the switch unit could keep track of the length of queues of transactions awaiting access to the various disk modules. This information could then be communicated back the host interface module and used to make a decision as to which allocation unit to select based on actual disk activity.

As previously noted, the parity-generation hardware 521 is used to form the parity blocks that are stored along with the data, therefore, in order to store one allocation unit, 128 kilobytes of data and parity information are sent over each of the five channels 507-515 to five different disks. Once the data has been stored on disk, the software sends a message to the relevant host interface module over the IPC links 546, 548 informing the host interface module that the contents of the allocation unit can now be released. However, those contents are not overwritten in either the host interface module or the disk interface module until the space is actually needed, thereby allowing for the possibility that the information might be requested again before it is expunged and hence can be retrieved without having to access physical disk storage.

Note that since an allocation unit is written as a unit, the parity information stored along with each disk stripe never has to be read and updated, reducing by ¾ths the number of disk accesses that would otherwise be needed to store a single page. For example, in prior art systems, the prior contents of the page to be stored has to be read, the parity page has to be read and modified based on the change between the new and old contents of the page in question, and the new page and the parity page both have to be stored. In the inventive system, the only time a parity page normally has to be read is when the data on some sector fails the standard cyclic residue code (CRC) check always used to protect data stored on disk. In this event, the parity sector is read and, in combination with the three error-free sectors, is used to reconstruct the contents of the defective sector.

As previously noted, the policy of writing data to arbitrary locations, while offering major performance advantages, can result in fragmentation of files that are only partially updated. Since each host interface module can use any allocation unit at its disposal, and, in fact, selects allocation units solely on the basis of the recent activity of the associated disks, files may well be split up among multiple disk interface modules. This tendency toward fragmentation is mitigated by a write-back policy. That is, when a host interface module reads a file that has been fragmented, it follows that read with a write, placing all the file fragments, or all that will fit, in the same allocation unit. The previously described technique for ensuring that newly written data and metadata are consistent is, of course, used with write-back operations as well.

Another potential inefficiency resulting from the "write anywhere" policy is that sections of allocation units are gradually replaced by more up-to-date versions written elsewhere, leaving holes in those allocation units that represent wasted disk space unless they are identified and reused. Since the reference count technique described earlier allows those sections to be identified, they can, in fact, be reused. To make their reuse more efficient, the software running on the disk interface modules CPU 532, as a background task, identifies those allocation units having more than a predetermined percentage of unused space and sends the GPDAs of the still-valid sectors to a host interface module so that the vectors can be read and rewritten more compactly.

Figure 7:
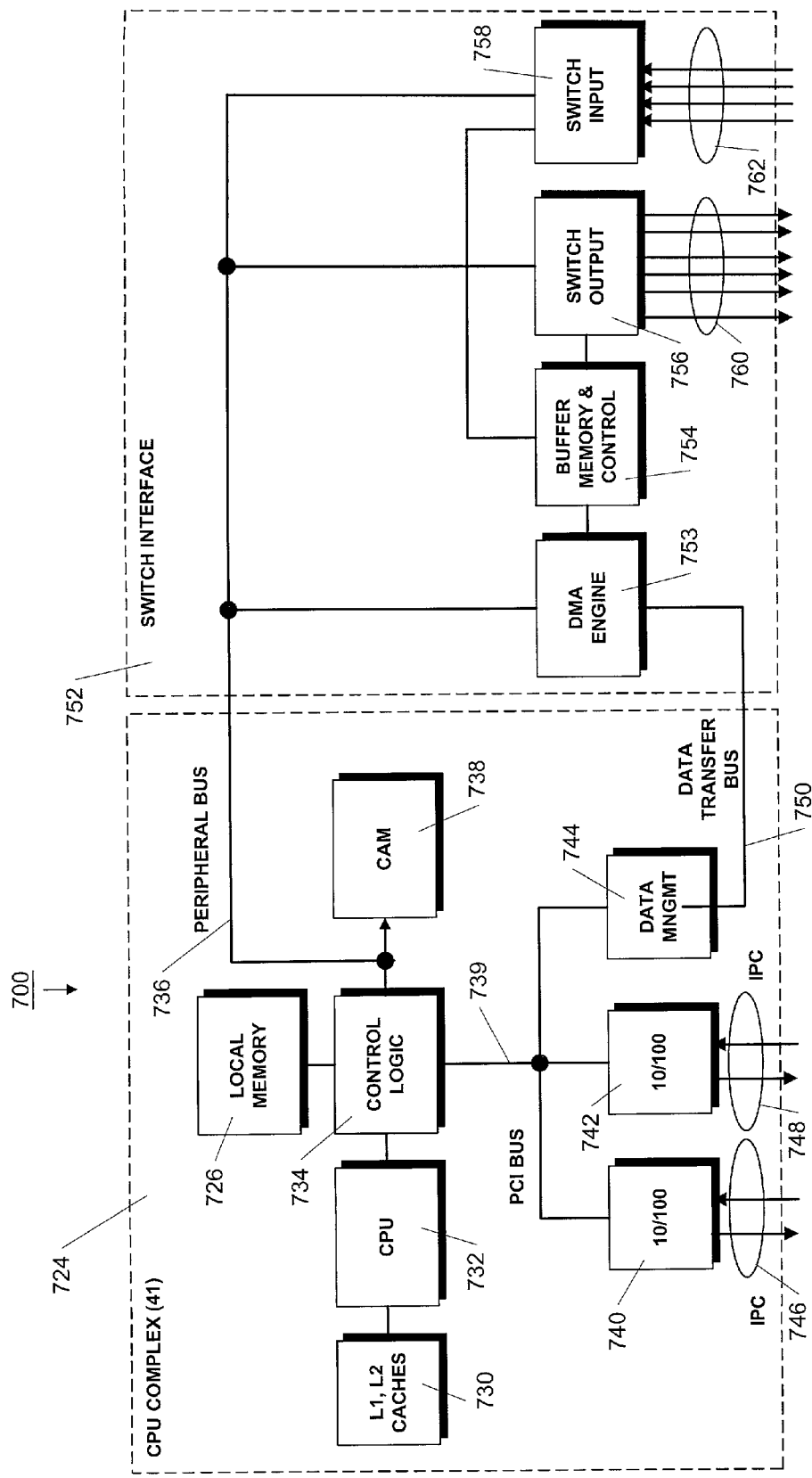
FIG. 7 is a detailed block schematic diagram of a metadata module.

The detailed construction of a metadata module 700 is shown in FIG. 7. The metadata module 700 differs from the host interface module 300 and disk interface module 500 in two basic ways: The metadata module 700 has no I/O complex since it does not communicate with either clients or disks; and the data complexes present in the host interface modules and disk interface modules are eliminated and their large data memories replaced by relatively a small memory 754 that serves as store-and-forward buffer. Data destined to be stored through the switch output 756 and connections 760 is first transferred, using a DMA engine 753, from the CPU's local memory 726 into the buffer memory 754 before being enqueued for transfer. Similarly, data received over the switch via connections 762 and switch input 758 is transferred from the input buffer 754 directly into preassigned locations in local memory 726.

Since the local memory 726 in the metadata module 700 stores all data received over the switch, it is considerably larger than its counterpart in the host interface 300 and disk interface modules 500, normally comparable in size to the latter modules' data memories, 322 and 522, respectively. The local memory 726 is used primarily for caching inodes and fmaps. The other elements shown in FIG. 7 are similar in function and implementation to the corresponding elements shown in FIGS. 3 and 5.

The purpose of the metadata module 700 is to maintain the file system structure, to keep all inodes consistent and to forward current inodes to host interface modules that request them. When a new file or directory is created, it is the responsibility of the metadata module to generate the associated inode and to insert a pointer to it into a B-tree data structure used to map between inodes and GPDAs. Similarly, when a file or directory is deleted, the metadata module must delete its associated inode, as well as those of all its descendents, and modify the B-tree data structure accordingly.

When a host interface module receives a request from a client that requires inode information that the host interface module cannot find in its own local memory, it uses the IPC links to query the metadata module associated with the file system in question. The steps taken by the software running on a metadata module CPU 732 to service a typical request are depicted in FIGS. 8A and 8B.

Figure 8A:
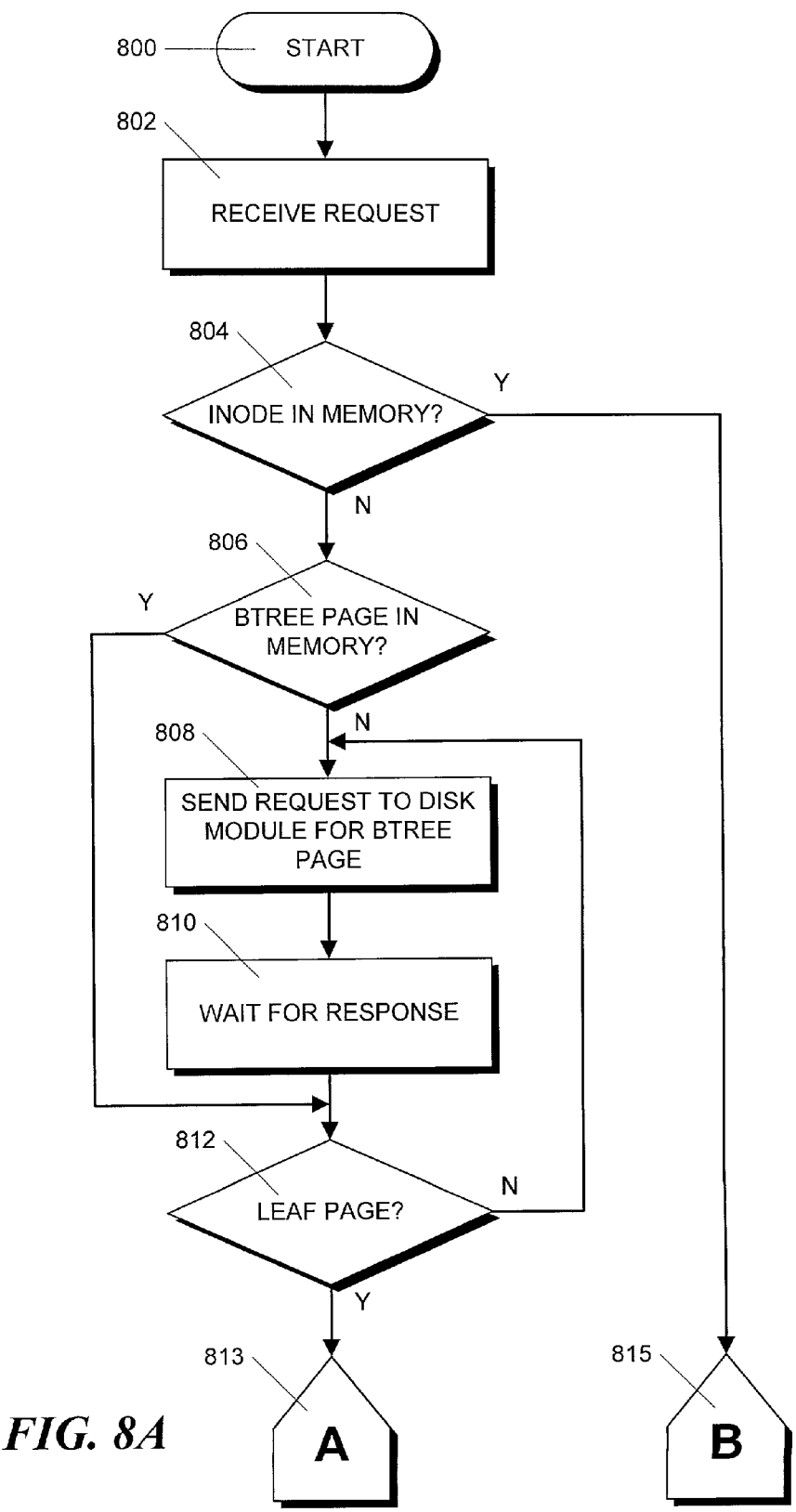
FIGS. 8A and 8B, when placed together, form a flowchart illustrating processing steps performed by software running in the metadata module.
Figure 8B:
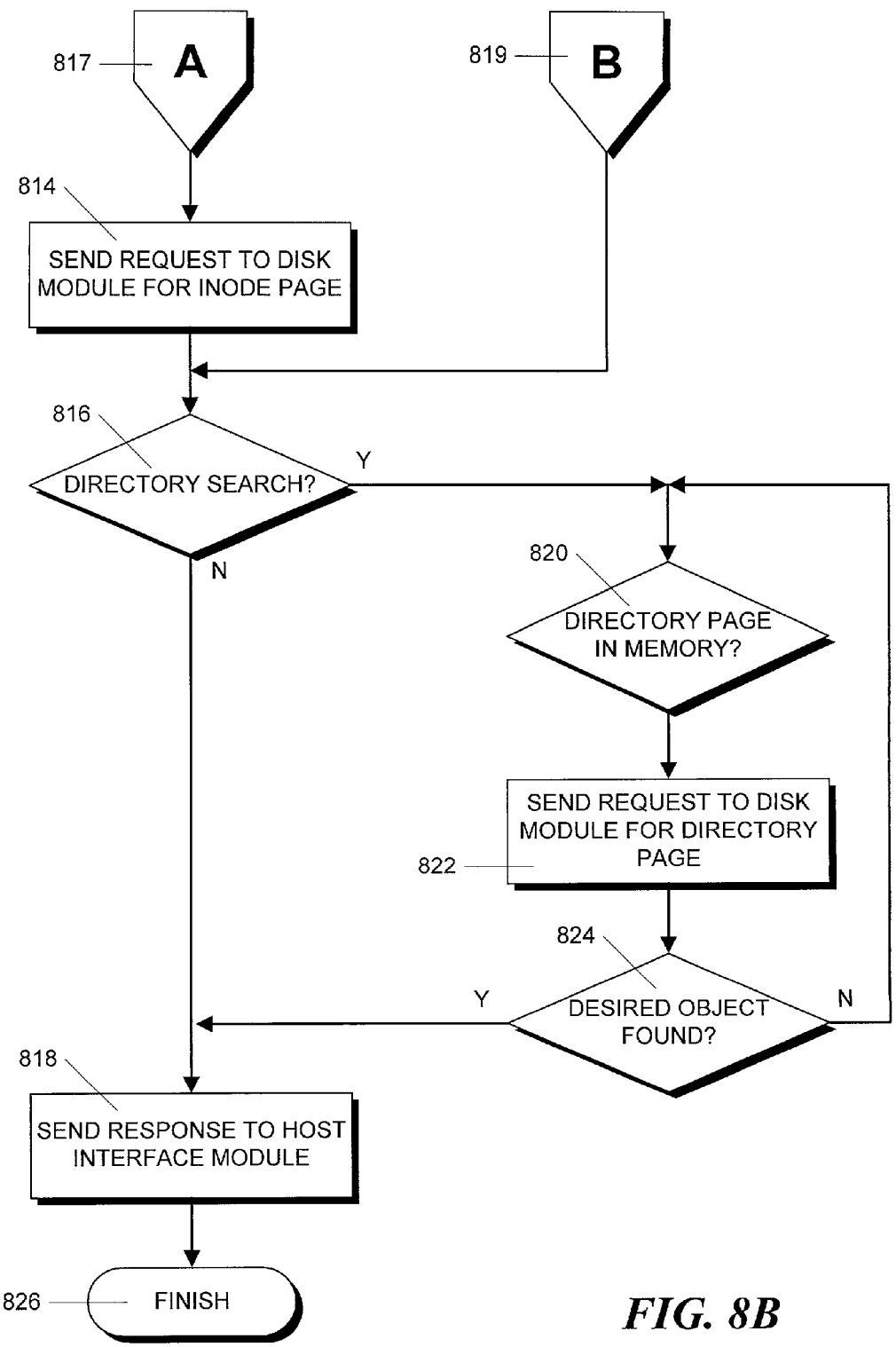

In FIG. 8A, the process begins in step 800 and proceeds to step 802 where a request is received by the metadata module. All requests to a metadata module for an object are accompanied by a handle that includes an "inode number" uniquely identifying the object, or the parent of the object, being requested. These unique inode numbers are assigned by the file system to each of its files and directories. The handle used by a client to access a given file or directory includes the inode number, which is needed to locate the object's associated inode. In step 804, the metadata module checks its CAM 738 using that inode number as a key. If the inode information is in the CAM 738, the process proceeds, via off-page connectors 815 and 819, to step 816, discussed below.

If the inode information is not in the local memory 726, as indicated by a cache "miss," the CPU software then searches through an inode B-tree data structure in memory 726 to find the GPDA of the inode data as indicated in step 806. If the necessary B-tree pages are not present in local memory, the process proceeds to step 808 where the software sends a message over IPC links 746, 748 to the appropriate disk interface module requesting that a missing page be returned to it over the switch. The metadata module 700 then waits for a response from the disk interface module (step 810.)

In step 812, the CPU software examines either the cached data from step 806 or the data returned from the request to the disk interface module in step 810 to determine if the data represents a leaf page. If not, the process returns to step 808 to retrieve additional inode information. If the data does represent a leaf node, then the process proceeds, via off-page connectors 813 and 817, to step 814. Once the metadata module 700 has located the GPDA of the inode itself (the desired leaf node), in step 814, the metadata module 700 sends a request over the IPC links 746, 748 for the page containing that inode. At this point, the inode information has been obtained from the CAM 738 in step 804 or by retrieving the information in step 814.

The process then proceeds to step 816 where a determination is made concerning the request. If the request received from the host interface module was to return the handle associated with a named object in a directory having a given inode number, the retrieved inode is that of the directory and the process proceeds to step 820.

To fulfill the request, the metadata module 700 must read the directory itself as shown in step 820. The CPU software first queries its CAM 738, using the directory's GPDA as a key, to determine if the directory information is cached in its local memory 726. If the desired information is present, then the process proceeds to step 818. If the directory, or the relevant portion of the directory is not cached, the software must again send a message over the IPC to the disk interface module storing the directory requesting that the directory information be returned to it through the switch as indicated in step 822. Once it has access to a directory page, it searches the page to find the desired object. If the object is not found in step 824, the process returns to step 820 to obtain a new page. Eventually it locates the named object and its associated inode number.

Finally, once the metadata module has located either the inode of the object specified by the handle or the inode of the named object, depending on the specific request, it forwards the requested information on to the requesting host interface module as set forth in step 818. The process then ends in step 826.

Figure 9:
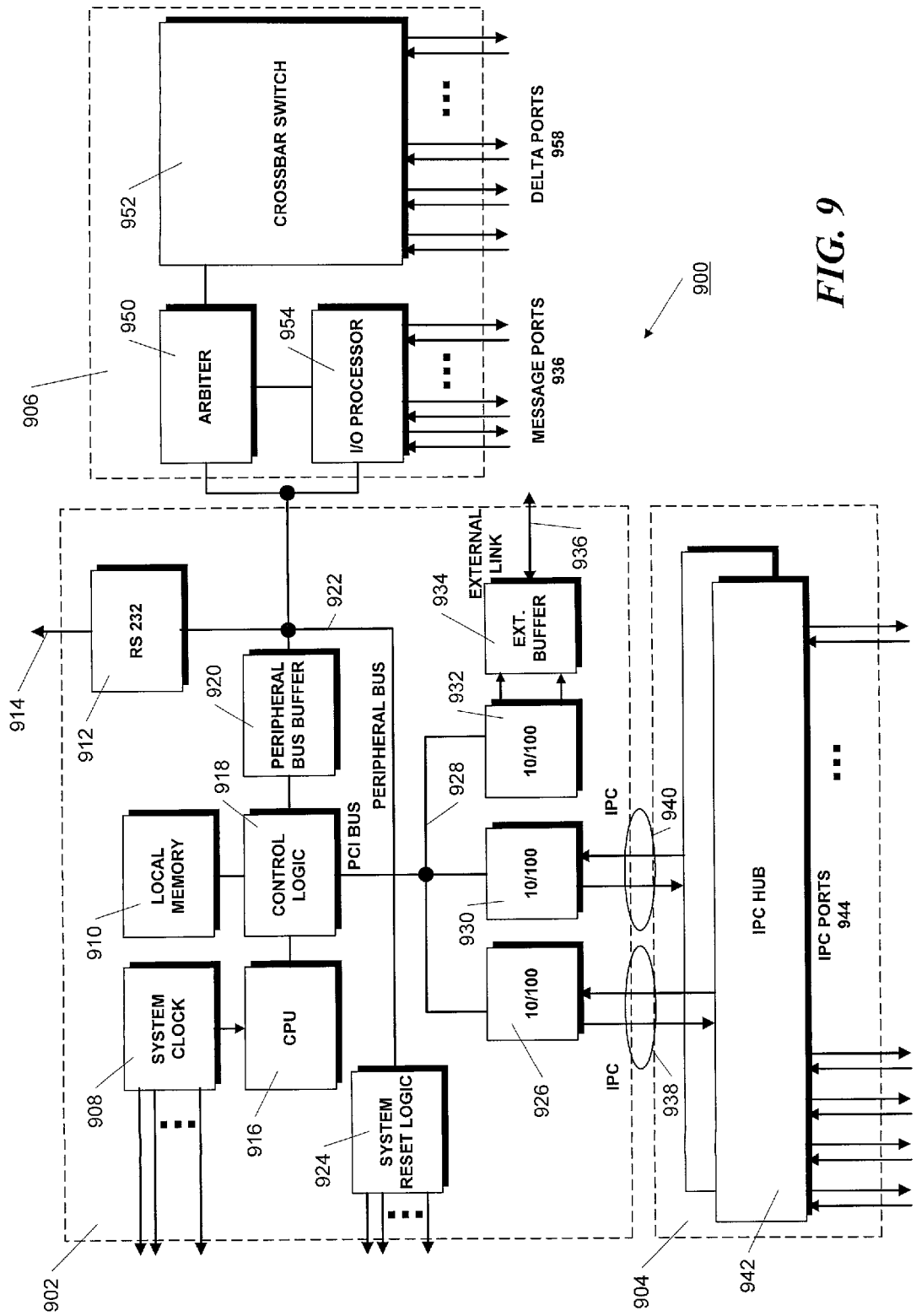
FIG. 9 is a detailed block schematic diagram of a switch module.

A detailed diagram of the switch module is shown in FIG. 9. The switch module 900 is composed of three major components: a crossbar switch complex 906 providing non-blocking, full-duplex data paths between arbitrary pairs of host interface modules, disk interface modules and metadata modules; an IPC complex 904 composed of switches 942 for two sets of full-duplex, serial, 10/100 Ethernet channels 938 and 940 that provide messaging paths between arbitrary pairs of modules; and a configuration management complex 902 including system reset logic 924 and the system clock 908.

The switch module is implemented as a redundant pair for reliability and availability purposes, however, only one of the pair is shown in FIG. 9 for clarity.

The I/O processor 954 in the crossbar switch complex 906 accepts requests from the switch interfaces 356, 556 and 756 on the host interface modules, disk interface modules and metadata modules, respectively over the request links and grants access over the grant links. Each module can have one request outstanding for every other module in the system or for any subset of those modules. During each switch cycle, the arbiter 950 pairs requesting modules with destination modules. The arbiter assigns weights to each requester and to each destination. These weights can be based on any of several criteria, e.g., the number of requests a requester or destination has in its queue, the priority associated with a submitted request, etc. The arbiter then sequentially assigns the highest weight unpaired destination to the unpaired requester having the highest weight among those requesting it. It continues this operation as long as any unpaired requester is requesting any, as yet, unpaired destination.

The I/O processor 954 then sends each requesting module, over the appropriate grant link, the identity of the module with which it has been paired and to which it can send a data packet during the next switch cycle. The arbiter 950 sets the crossbar switch 952 to the appropriate state to effect those connections.

The switch 952 itself consists of four sets of multiplexers, one multiplexer from each set for each destination, with each multiplexer having one input from each source. Switch cycles are roughly four microseconds in duration, during which time two kilobytes of data are sent between each connected pair with a resulting net transfer rate of approximately 500 megabytes/second per connected pair.

The function of the IPC switches 942 is to connect source and destination IPC ports 944 long enough to complete a given transfer. The standard IEEE 802.3 SNAP (sub-network access protocol) communication protocol is used consisting of a 22-byte SNAP header followed by a 21-byte message header, a data packet of up to 512 bytes and a 32-bit cyclic residue code (CRC) to protect against transmission errors.

The configuration management complex 902 coordinates system boot and system reconfiguration following faults. To support the first of these activities, it implements two external communications links: one 936 giving access through the PCI bus 928 via full-duplex, serial, 10/100 Ethernet channel 932; and the other 912 giving RS-232 access 914 through the peripheral bus 922. To support the second activity, it implements the reset logic 924 for the entire system. It also implements and distributes the system clock 908.

The disclosed invention has several significant fault-tolerant features. By virtue of the fact that it is implemented with multiple copies of identical module types and that all of these modules have equal connectivity to all other modules, it can survive the failure of one or more of these modules by transferring the workload previously handled by any failed module to other modules of the same type. The switch fabric itself, of course, is a potential single point of failure since all inter-module communication must pass through it. However, as mentioned in the previous section, the switch in the preferred implementation is implemented with two identical halves. During the initialization process, the two configuration management complexes 902 communicate with each other, via the IPC channels, to determine if both are functioning properly and to establish which will assume the active role and with the standby role. If both switch halves pass their self-diagnostic tests, both sets of IPC channels are used and the configuration management complexes 902 cooperate in controlling the system configuration and monitoring its health. Each switch half, however, supports the full data bandwidth between all pairs of modules, therefore only the active half of the switch is used for this purpose. If one switch half becomes inoperative due to a subsequent failure, the configuration management complexes cooperate to identify the faulty half and, if it is the half on which the active configuration manager resides, transfer that role to the former standby half. The surviving configuration manager communicates the conclusion to the other system modules. These modules then use only the functioning half of the switch for all further communication until notified by the configuration manager that both halves are again functional. Although the IPC bandwidth is halved when only one switch half is operational, the full data bandwidth and all other capabilities are retained even under these circumstances.

Several complementary methods are used to identify faulty modules, including (1) watchdog timers to monitor the elapsed time between the transfer of data to a module and the acknowledgement of that transfer and (2) parity bits used to protect data while it is being stored in memory or transferred from one point to another. Any timeout or parity violation triggers a diagnostic program in the affected module or modules. If the violation occurred in the transfer of data between modules, the fault could be in the transmitting module, the receiving module or in the switch module connecting the two so the diagnostic routine involves all three modules checking both themselves and their ability to communicate with each other. Even if the diagnostic program does not detect a permanent fault, the event is logged as a transient. If transient event recurs with a frequency exceeding a settable parameter, the module involved in the greatest number of such events is taken off line and the failure treated as permanent, thereby triggering manual intervention and repair. If transients continue, other modules will also be taken off line as a consequence until the fault is isolated.

Byte parity is typically used on data stored in memory and various well-known forms of vertical parity checks and cyclic-residue codes are used to protect data during transfer. In addition, in the storage system embodiment described here, data tags consisting of 32-bit vertical parity check information on each data page are stored on disk separately from the data being protected. When data is retrieved from disk, the tag is also retrieved and appended to the data. The tag is then checked at the destination and any discrepancy flagged. This provides protection not only from transmission errors but also from disk errors that result in reading the wrong data (or the wrong tag). This latter class of errors can result, for example, from an addressing error in which the wrong sector is read from disk or from a write current failure in which old data is not overwritten.

Another important fault-tolerant feature of the storage system embodiment of the invention is the requirement that all data and metadata be stored on at least two different modules or on parity-protected disk before the receipt of any data is acknowledged. This guarantees that the acknowledged data will still be available following the failure of any single module. Similarly, data stored on disk is protected against any single disk failure, and against any single disk channel failure, by guaranteeing that each data block protected by a parity block is stored on a different physical disk, and over a different disk channel, from all other blocks protected by the same parity block and from the disk storing the parity block itself.

Finally, the fact that all disks are dual-ported to two different disk interface modules guarantees that data can still be retrieved should any one of those disk interface modules fail. Following such an event and the resulting reconfiguration, all subsequent accesses to data stored on the affected disks are routed through the surviving disk interface module. While this may result in congestion because the surviving disk interface module is now servicing twice as many disks, it retains full accessibility. In addition, the previously described load-balancing capability of the system will immediately begin redistributing the workload to alleviate that congestion.

Similar protection against host interface module failures can be achieved by connecting clients to more than one host interface module. Since all host interface modules have full access to all system resources, any client can access any resource through any host interface module. Full connectivity is retained as long as a client is connected to at least one functioning host interface module and, connection to more than one host interface module provides not only protection against faults, but also increased bandwidth into the system.

The architecture described in the previous paragraphs exhibits several significant advantages over current state-of-the-art storage system architectures:

1) It is highly scaleable. Host interface modules, disk interface modules and metadata modules can all be added independently as needed and their numbers can be independently increased as storage throughput or capacity demands increase. A system using a 16-port crossbar switch, for instance, can support any combination of host interface modules, disk interface modules and metadata modules up to a total of 16. This would allow a system to be configured, for example, to give 32 directly connected clients access to over 40 terabytes of data (using 36-gigabyte disks) supported by two metadata modules. Obviously, even larger configurations can be realized with larger IPC and wider crossbar switches.

2) Since writes can be directed to arbitrary disk interface modules, demand can be equalized across all disk resources, ensuring that throughput will increase nearly linearly with the number of disk interface modules in the system. Further, writes can take place in parallel with fmap updates thereby decreasing the latency between the initiation of a data write and the acknowledgement that it has been accepted. Since both the data and the metadata associated with a new write are always stored in two independent places before that write is acknowledged, write acknowledgements can be issued before data is actually stored on disk while still guaranteeing that the data is secure.

3) Relegating metadata operations to modules designed for that purpose not only enables faster metadata processing but, in addition, allows the host interface and disk interface modules to be structured as efficient data pipes, with the bulk of local memory partitioned as a bi-directional buffer. Since the client's communication protocol is terminated in the host interface module I/O complex, the bulk of data passing through this data memory does not need to be examined by the host interface module CPU software.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to particular embodiments of host interface modules, disk interface modules, metadata modules and switch modules, that other designs could be used in the same manner as that described.

Other aspects, such as the specific circuitry utilized to achieve a particular function, as well as other modifications to the inventive concept are intended to be covered by the appended claims

What is claimed is:

1. Apparatus for providing high-performance, scaleable data storage services to a client from a plurality of storage devices, comprising:

an access interface module which receives from the client data storage requests, each including a data object to be stored and a data object identifier that identifies that data object and, in response to each storage request and based on a workload and on relative demands placed on subsets of the plurality of storage devices instead of a physical location in the plurality of storage devices, dynamically selects a subset of the plurality of storage devices in which the data is stored so that data corresponding to the same data object identifier can be transferred to different physical storage device locations from request to request in order to dynamically distribute the workload across the plurality of storage devices; and a switch fabric for temporarily connecting the access interface module to the selected subset of the plurality of storage devices so that the data can be transferred to the selected subset of storage devices.

2. The apparatus of claim 1 wherein the switch fabric comprises a control switch fabric for transferring control information and a separate data switch fabric for transferring data.

3. The apparatus of claim 2 wherein the control switch fabric is optimized for transferring control information and the data switch fabric is optimized for transferring data.

4. The apparatus of claim 2 wherein the request for storage includes control information and data and wherein the access interface module separates the control information and the data and transfers the data to the selected subset of storage devices over the data switch fabric.

5. The apparatus of claim 2 wherein the data switch fabric comprises a non-blocking crossbar switch for data transfer and the control switch fabric comprises an Ethernet switch for control information transfer.

6. The apparatus of claim 1 further comprising a resource module connected to the plurality of storage devices for generating preallocation information that preallocates storage from the plurality of storage devices in order to evenly distribute a workload across the plurality of storage devices.

7. The apparatus of claim 6 wherein the switch fabric connects the access interface module to the resource module so that the resource module can transfer the preallocation information to the access interface module.

8. The apparatus of claim 7 wherein the access interface module selects a subset of the plurality of storage devices based on the preallocation information.

9. The apparatus of claim 1 wherein the access interface module comprises a data memory which temporarily stores information transferred between the access interface module and the selected subset of the plurality of storage devices.

10. The apparatus of claim 1 further comprising a plurality of access interface modules each access interface module receiving storage requests from a plurality of clients.

11. A method for providing high-performance, scaleable data storage services to a client from a plurality of storage devices, the method comprising (a) providing an access interface module which receives from the client data storage requests, each including a data object to be stored and a data object identifier that identifies that data object;

(b) using the access interface module in response to each data storage request and based on a workload and on relative demands placed on subsets of the plurality of storage devices instead of a physical location in the plurality of storage devices, dynamically selects a subset of the plurality of storage devices in which the data is stored so that data corresponding to the same data object identifier can be transferred to different physical storage device locations from request to request in order to dynamically distribute the workload across the plurality of storage devices; and (c) using a switch fabric to temporarily connect the access interface module to the selected subset of the plurality of storage devices so that the data can be transferred to the selected subset of storage devices.

12. The method of claim 11 wherein step (c) comprises:

(c1) using a control switch fabric for transferring control information; and (c2) using a separate data switch fabric for transferring data.

13. The method of claim 12 wherein step (c1) comprises optimizing the control switch fabric for transferring control information and step (c2) comprises optimizing the data switch fabric for transferring data.

14. The method of claim 12 wherein the request for storage includes control information and data and wherein step (b) comprises separating the control information and the data and step (c) comprises transferring the data to the selected subset of storage devices over the data switch fabric.

15. The method of claim 12 wherein step (c1) comprises using a non-blocking crossbar switch for data transfer and step (c2) comprises using an Ethernet switch for control information transfer.

16. The method of claim 11 further comprising:

(d) providing a resource module connected to the plurality of storage devices; and (e) using the resource module to generate preallocation information that preallocates storage from the plurality of storage devices in order to evenly distribute a workload across the plurality of storage devices.

17. The method of claim 16 wherein step (c) comprises connecting the access interface module to the resource module so that the resource module can transfer the preallocation information to the access interface module.

18. The method of claim 17 wherein step (b) comprises selecting a subset of the plurality of storage devices based on the preallocation information.

19. The method of claim 11 wherein step (b) comprises temporarily storing information transferred between the access interface module and the selected subset of the plurality of storage devices.

20. The method of claim 11 wherein step (a) further comprises providing a plurality of access interface modules each access interface module receiving storage requests from a plurality of clients.

* * * * *